United States Patent
Kapoor et al.

(10) Patent No.: US 9,601,268 B2
(45) Date of Patent: Mar. 21, 2017

(54) WIRELESSLY POWERED DEVICES

(71) Applicant: NXP B.V., Eindhoven (NL)

(72) Inventors: Ajay Kapoor, Veldhoven (NL); Peter Thueringer, Graz (AT)

(73) Assignee: NXP B.V., Eindhoven (NL)

( * ) Notice: Subject to any disclaimer, the term of this patent is extended or adjusted under 35 U.S.C. 154(b) by 595 days.

(21) Appl. No.: 14/089,746

(22) Filed: Nov. 25, 2013

(65) Prior Publication Data

US 2014/0145513 A1    May 29, 2014

(30) Foreign Application Priority Data

Nov. 26, 2012    (EP) .................... 12194244

(51) Int. Cl.
| | |
|---|---|
| *H01F 27/42* | (2006.01) |
| *H01F 37/00* | (2006.01) |
| *H01F 38/00* | (2006.01) |
| *H01F 38/14* | (2006.01) |
| *G06K 19/073* | (2006.01) |
| *H02J 5/00* | (2016.01) |
| *H02J 7/00* | (2006.01) |
| *H02J 7/34* | (2006.01) |
| *H02J 7/02* | (2016.01) |

(52) U.S. Cl.
CPC ........... *H01F 38/14* (2013.01); *G06K 19/073* (2013.01); *H02J 5/005* (2013.01); *H02J 7/0024* (2013.01); *H02J 7/345* (2013.01); *H02J 7/025* (2013.01)

(58) Field of Classification Search
CPC .. H02J 5/005; H02J 7/025; H02J 17/00; H02J 7/0042; H02J 50/10; H02J 7/04; H02J 7/042; H02J 50/12; H02J 50/80; H02J 2007/0001; H02J 50/27; H02J 50/40
USPC ........................................................ 307/104
See application file for complete search history.

(56) References Cited

U.S. PATENT DOCUMENTS

| | | |
|---|---|---|
| 5,734,205 A | 3/1998 | Okamura et al. |
| 5,960,898 A | 10/1999 | Okada et al. |

(Continued)

FOREIGN PATENT DOCUMENTS

| | | |
|---|---|---|
| EP | 2469693 A1 | 6/2012 |
| WO | 2011/124251 A1 | 10/2011 |

(Continued)

OTHER PUBLICATIONS

Kapoor, A. et al "Architectural Analysis for Wirelessly Powered Computing Platforms", IEEE Transactions on Very Large Scale Integration (VLSI) Systems, vol. 21, No. 11, pp. 2106-2117 (Nov. 2013).

(Continued)

*Primary Examiner* — Jared Fureman
*Assistant Examiner* — Esayas Yeshaw

(57) ABSTRACT

A circuit for delivering power to a load from a wireless power supply comprises an inductor coil for placing in the electromagnetic field of an inductor coil of a supply and a switchable capacitor bank with capacitors switchable at least between a series and a parallel configuration. The voltage across the capacitor bank is used as a feedback control parameter for controlling the capacitor bank switching. A voltage regulator is used to supply the load with a constant voltage power supply derived from the capacitor bank output.

17 Claims, 2 Drawing Sheets

(56) References Cited

U.S. PATENT DOCUMENTS

| | | | |
|---|---|---|---|
| 6,205,012 B1 * | 3/2001 | Lear | H01F 13/003 |
| | | | 361/139 |
| 8,207,798 B1 * | 6/2012 | Wright | H03F 1/565 |
| | | | 333/17.3 |
| 8,247,990 B1 * | 8/2012 | Gordin | H05B 41/40 |
| | | | 315/144 |
| 8,471,570 B2 * | 6/2013 | Portmann | 178/18.06 |
| 2007/0059016 A1 * | 3/2007 | Sato | G03G 15/80 |
| | | | 399/88 |
| 2008/0164978 A1 | 7/2008 | Tanada | |
| 2009/0243397 A1 * | 10/2009 | Cook | H02J 5/005 |
| | | | 307/104 |
| 2011/0181240 A1 | 7/2011 | Baarman | |
| 2012/0052810 A1 | 3/2012 | Schreuder et al. | |
| 2013/0049484 A1 * | 2/2013 | Weissentern | H02J 5/005 |
| | | | 307/104 |

FOREIGN PATENT DOCUMENTS

| | | | |
|---|---|---|---|
| WO | 2011/132302 A1 | 10/2011 | |
| WO | WO 2012015942 A1 | 2/2012 | |

OTHER PUBLICATIONS

"Charge Pump", Wikipedia, 1 pg, retrieved Oct. 31, 2013, retrieved from the internet at: http://en.wikipedia.org/wiki/Charge_pump.
Sanchez, W. et al; "An Energy Management IC for Bio-Implants Using Ultracapacitors for Energy Storage", 2010 Symposium on VLSI Circuits/Technical Digest of Papers, pp. 63-64 (2010).
Extended European Search Report for EP application 12194244.5 (Apr. 29, 2013).

* cited by examiner

WIRELESSLY POWERED DEVICES

CROSS-REFERENCE TO RELATED APPLICATIONS

This application claims the priority under 35 U.S.C. §119 of European patent application no. 12194244.5, filed on Nov. 26, 2012, the contents of which are incorporated by reference herein.

This invention relates to wirelessly powered devices.

Wireless energy transfer was first envisioned by Nikola Tesla, but recent technological advancements have led to a renewed interest in this concept.

A generic device using magnetic coupling to transfer wireless energy is depicted in FIG. 1.

The basic principle is that a transmitter coil 10 sets up a magnetic field, which induces current in a receiver coil 12 to charge a capacitance 14. The power transmission part comprises a power source 16 and the transmitting coil 10 to set up an electromagnetic field. The receiver is divided into the receiving coil 12, a rectifying circuit 18 and an electronic system 20 using the received energy. The received energy is stored in an energy storage device (such as a capacitor Cs) by building a voltage, Vc. This energy is further used to power up various system elements, which may include analog, digital electronic components, sensors, transducers, etc.

One main characteristic of these systems is the non-static nature of energy availability from the energy source.

Due to this, whenever possible the wireless energy receiving system captures the energy from the energy field and stores it into its own capacitor 14. The energy is stored by building the voltage (Vc) on the capacitor. This stored energy is used to supply the energy to the system and keep it operational even when there is no more energy captured from the electric field.

To keep the system operational, there are certain voltage bounds that are observed on the storage capacitor Cs.

This means that the output voltage Vc should not go lower than a minimum Vmin and should not be charged higher than a maximum Vmax. Therefore, operation of the system is halted as soon as the Vmin level is reached. The maximum voltage level is ensured by clipping the voltage Vc to the Vmax level.

Thus, during the charging phase (when energy is captured) Vc tends towards Vmax and during discharging phase (when energy cannot be captured and operation is sustained) Vc tends towards Vmin. An energy cycle comprises alternating charge and discharge phases.

The amount of energy that can be stored in the capacitor is proportional to its capacitance Cs. Therefore, the duration over which the system can sustain its operation in the absence of energy field is directly proportional to the capacitance Cs.

The larger the value of Cs, the longer will be the duration. On the other hand, a larger Cs means more silicon area and higher costs.

In wirelessly powered systems like contactless smart cards, the system needs to remain powered up for a certain time duration even in the absence of the energy field. For example, this is required to implement so-called Modified Miller Encoding in proximity coupling device (PCD) to proximity car (PICC) communications, in the identification card standard ISO/IEC FCD 14443-2. The energy stored in the capacitor is used to supply the system energy. However, the amount of capacitance required to supply this energy for the given duration gets prohibitively high and is a main area contributor for the design. This leads to high silicon costs for the system.

Furthermore, when the power delivery block is used to supply the energy to a computing platform (such as a contactless smart card), the main energy consumption is in the digital computation. In this case, the system powers computing processors and is realised using standard synchronous design techniques where constant supply voltages are essential.

Based on the available energy, the computation frequency (for example in the MHz range) can be varied to provide varying throughputs. Such designs are commonly realised in CMOS processes having an operating voltage range. The range is used for tolerating various variations (process, temperature, load adaptivity etc.) but the actual output voltage value should remain constant.

An approach to lower the requirement on the capacitance is by realising the capacitance in the form of a capacitor bank and smartly reconfiguring the bank according to the operational requirements. This lowers the total amount of storage capacitance requirement, thereby, lowering the overall design costs and makes the system economically feasible.

The article "An Energy Management IC for Bio-Implants Using Ultracapacitors for Energy Storage" by William Sanchez et. al., 2010 Symposium on VLSI Circuits/Technical Digest of Papers, pp. 63-64, discloses the use of a configurable capacitor array which switches between series and parallel configurations to maintain an output voltage within a desired range.

In this article, the power delivery to the output load is based on a switched capacitor converter (SCC). The output voltage of the SCC varies as a function of input voltage and this output voltage is used to exploit the switching control logic of the capacitor bank. The load requires a tolerance to this voltage change and this system requires significant additional circuitry to provide the control of the switchable capacitor bank.

According to the invention, there is provided a circuit for delivering power to a load from a wireless power supply, comprising:

an inductor coil for placing in the electromagnetic field of an inductor coil of a supply;

a switchable capacitor bank with capacitors switchable at least between a series and a parallel configuration;

a voltage detecting device for measuring the voltage or detecting predetermined voltages across the capacitor bank;

a switch controller for controlling the capacitor bank switching in dependence on the measured or detected voltages; and a voltage regulator for supplying the load with a constant voltage power supply derived from the capacitor bank output.

This circuit makes use of the voltage across a switched capacitor network (which can be an embedded part of the circuit) for controlling the capacitor configuration. The voltage detecting device can be present for other circuit functions, such as for a safe power down function or for over-voltage protection, so that existing detection signals can be used for the control of the switchable capacitor bank. This can enable a single chip solution for all the circuit components providing power to the output load, or even can enable a single chip solution including the output load.

The voltage detecting device can measure voltage levels or it may detect the presence of certain voltages based on other indicators, such as the presence or absence of a current flow, for example. Thus, the voltage detection may be direct or indirect.

A voltage clipper can be provided for limiting the maximum voltage across the capacitor bank. This can serve the dual purpose of protection and for detecting the maximum voltage, which can be used by the switch controller. An active status of the voltage clipper (for example based on detection of a current flow) can be used as a detection of the maximum voltage, instead of using actual voltage measurement.

A voltage limiter can be provided for providing a power down if a minimum voltage is present across the capacitor bank. Again, this can serve the dual purpose of enabling a safe shut down in the event of detecting a minimum voltage, and for use by the switch controller.

The voltage regulator can comprise a low drop out voltage regulator. This enables a very constant voltage to be provided at the output, suitable for driving a load in the form of a digital signal processor.

The switch regulator is preferably adapted to control the capacitor bank such that:

during an increase in voltage across the capacitor bank, the capacitor bank is switched from a series configuration to a parallel configuration when the voltage reaches a maximum voltage; and during a decrease in voltage across the capacitor bank, the capacitor bank is switched from a parallel configuration to a series configuration when the voltage reaches a minimum voltage.

This approach provides switching in the most efficient manner.

The invention also provides a method for delivering power to a load from a wireless power supply, comprising:

placing an inductor in the electromagnetic field of an inductor coil of a supply;

measuring the received voltage or detecting predetermined received voltages;

controlling switching of a capacitor bank which is switchable at least between a series and a parallel configuration in dependence on the measured or detected voltages; and supplying a load with a constant voltage power supply derived from the capacitor bank output by a voltage regulator.

An example of the invention will now be described in detail with reference to the accompanying drawings, in which.

The invention provides a circuit for delivering power to a load from a wireless power supply, comprising an inductor coil for placing in the electromagnetic field of an inductor coil of a supply and a switchable capacitor bank with capacitors switchable at least between a series and a parallel configuration. The voltage across the capacitor bank is used as a feedback control parameter for controlling the capacitor bank switching. A voltage regulator is used to supply the load with a constant voltage power supply derived from the capacitor bank output.

The invention relates in particular to the wireless powering of a device which requires a constant supply voltage.

Thus, the output voltage on the load must remain as constant as possible. This means that load voltage can for example be 1V or 1.2 V, but it should remain same over time (quasistatic). If this is not followed, then the timing enclosures (static timing analysis) will become a major challenge in the standard digital design practises. For example, a timing path could observe a 1.2 V supply while a delayed timing path will see a 1V supply. The timing analysis (setup-hold violations etc.) can then easily require significant overdesigning of the system and in practical situations it can make system realisation nearly impossible for system throughputs of interest.

During switching time instants (clock edges) of a digital signal, there are high current requirements (10-100 mA) even though a much lower average current is required in the load, for example 1 mA. This means that the energy is transferred in bursts from the input to output. Using an SCC as proposed in the prior art referenced above of Sanchez et. al., will make the system efficiency extremely low and a system realisation for high throughputs very difficult. To overcome this, a very large SCC is required or a very high clock rate in the SCC. These options will result in a large area and high power loss and may impact some of other system constraints like interference, for example interference to a simple amplitude modulation communication system.

In order to supply high currents while maintaining the power delivery complexity manageable, a source follower topology based on low drop out (LDO) regulator scheme can be used.

The average output voltage may be permitted to vary (in a quasi-static manner) due to load variability and high switching activity. However, at each clock edge of a digital load, there are high current spikes which cause an instantaneous drop in output voltage. This will make any feedback control based on the output voltage sensitive to voltage transients.

Apart from timing design issues, in security sensitive applications (such as smart cards), there may additionally be provided voltage sensors present to sense any tampering activity. These sensors also have their own design margin. Consequently, the design margin for the power delivery block is further limited and cannot allow any additional variation.

Figure 2:
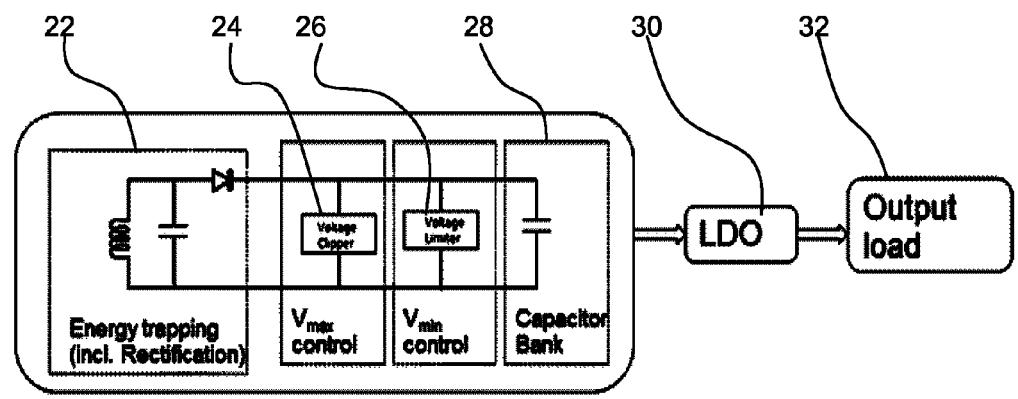
FIG. 2 shows schematically the configuration of the system of the invention.

FIG. 2 shows schematically the circuit of the invention.

Figure 1:
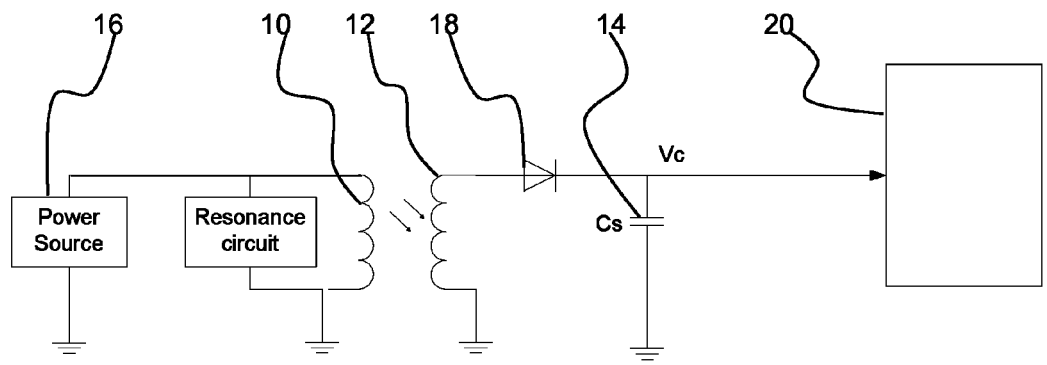
FIG. 1 shows the basic configuration of a wirelessly powered system.

The circuit comprises an energy trapping circuit 22, which is conventional, as in FIG. 1.

The output is provided to a voltage clipper 24 for controlling the maximum voltage, and a voltage limiter 26 for controlling the minimum voltage. A switchable capacitor bank 28 is provided at the output, instead of the single capacitor shown in FIG. 1. Switching logic is used to control the switching of the capacitor bank.

The output of the capacitor bank 28 is supplied to an LDO voltage regulator 30 which in turn generates the supply voltage for the digital load 32.

The voltage clipper 24 is required to limit the maximum voltage ($V_{max}$) on the energy storage capacitor bank 28. $V_{max}$ is generally determined by:

the maximum voltage rating of the devices in fabrication process;

the energy trapping capability from the energy field.

In one example of traditional design, the realisation of this block is done by providing an alternative current-path, which is activated beyond $V_{max}$. Therefore, before $V_{max}$ is reached, the energy/current from the energy field is used to charge the capacitor bank. After the $V_{max}$ level is reached, the voltage-clipper block acts as sink for the field current.

There are other ways to implement this clipping approach. For example, the incoming current to charge the capacitor may saturate as the voltage is increased. In this case, an alternative current path may not be needed. Again, the Vmax level can be extracted based on the existing system realisation, in this case based on current saturation.

In the circuit of FIG. 2, the current in the voltage-clipper block 24 can be used to control the switching logic of the capacitor bank. Alternatively, the $V_{max}$ level may also be used to control the switching logic based on voltage level detection.

The voltage limiter 26 can be an actual design block or a virtual block in the system. This block identifies the minimum energy level beyond which operation of the system cannot be sustained in a reliable manner. Therefore, the block is used to power-off the system in a graceful manner. This means that a proper powering down protocol is followed before halting the operation of the circuit.

There can be multiple levels of energy limiting within in the system. At first, the system may go to a lower operating frequency and then to a sleep/stand-by mode. Eventually, the minimum level trigger may invoke complete powering down of the system.

In a direct realisation, the limiter block 26 can be based on a direct voltage/energy sensor across the capacitor bank. In an indirect realisation (virtual block design), energy consumption in the system is budgeted against the energy storage capacity. Thus, based on the design time parameters and computing algorithms, the system can be designed such that no direct minimum voltage sensing is required. In another alternative realisation, minimum voltage sensing may be realised.

The invention is implemented in a system in which an absolute minimum for powering down is based on an allowed minimum voltage level on the capacitor bank before power-off. An indirect computation based on time/energy can be used in the digital system to guarantee that the absolute value $V_{min}$ is never reached in the capacitor bank. A similar principle can be used to adaptively control the operating frequency of the system.

These two measures are used to control the logic of the capacitor bank switching.

The voltage level Vmin used for capacitor bank switching will be higher than the absolute minimum value voltage, and the value Vmin can be seen as an operating minimum. Basically, the absolute-minimum level to operating-minimum difference is determined by design tolerances and system uncertainty. Thus, some design margin is kept.

The power delivery block is used to supply the energy to an output load 32 in the form of a computing platform, in particular a contactless smart card, where the main energy consumption is in the digital computation. The digital system is realised using standard synchronous design techniques where the clocking instants cause severe current spikes. Moreover, based on the available energy, the computation frequency is varied to provide varying throughputs. The designs are commonly realised in processes where the common operating device have a voltage range, and the range is used for tolerating all sorts of variations (process, temperature, load adaptivity etc.).

Figure 3:
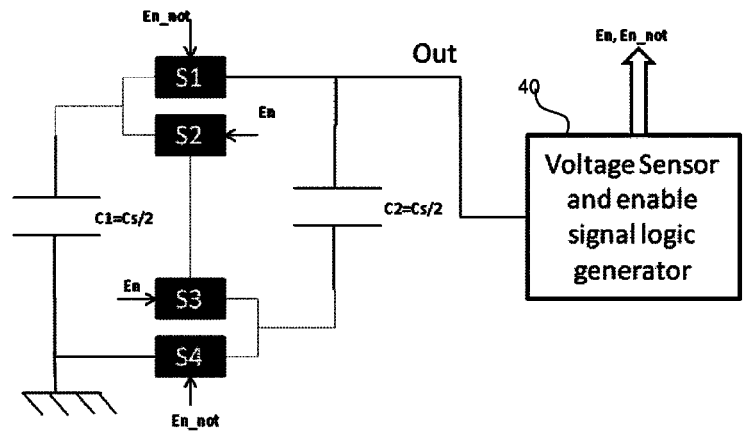
FIG. 3 shows the switchable capacitor bank used in the circuit of FIG. 2 in more detail.

As shown in FIG. 3, in one example the original capacitance Cs (from FIG. 1) is decomposed into two equal parts, C1 and C2 of equal capacitance, and the total capacitance is the same. These two parts are connected via switches, namely switches S1, S2, S3, S4. These switches connect C1 and C2 either in a series topology or in a parallel topology.

When switches S1 and S4 are conducting (S2 and S3 are open), C1 and C2 are in a parallel configuration. This means that output capacitance is equal to Cs. When S2 and S3 are conducting (S1 and S4 are open), then C1 and C2 are connected in series. Therefore, output capacitance is only Cs/4.

Switches (S1, S2, S3, S4) are controlled by complementary enable signals (En and En_not). These enable signal are generated by observing the voltage of the output of the capacitor bank. Based on the voltage and current topology, the polarity of these enabling signals are controlled.

The Vmin and Vmax signals are used as inputs to the switching logic 40 which then controls the capacitor bank switching.

In the basic approach of FIG. 1, during the charge phase of the system, the capacitance Cs is charged to Vmax and during the discharge phase it is discharged to Vmin level. The minimum voltage of Cs is Vmin and system stops functioning below this level. Therefore, energy available during the discharging phase $$E_c = \frac{C_s \Delta V^2}{2}$$
$$= \frac{C_s(V_{max}^2 - V_{min}^2)}{2}$$

During the charging phase, the same amount of energy is captured from the field and stored on Cs. If the system consumes power Ps during the discharge phase, this means that system can remain operational for duration Tdis, where Tdis is given by $$T_{dis} = \frac{E_c}{P_s}$$
$$= \frac{C_s(V_{max}^2 - V_{min}^2)}{2P_s}$$

In the approach of FIG. 3, the discharge phase starts when the capacitor bank has output capacitance Cs (C1+C2), i.e., C1 and C2 are in parallel and the output voltage is Vmax. The system discharges in the same way as a traditional system. However, when the output voltage reaches Vmin level, the capacitor bank is switched such that C1 and C2 become in series. This results in the output voltage of capacitor bank becoming restored to 2Vmin and the effective capacitance becomes ¼ Cs (since C1=C2=½ Cs).

Now, the capacitor bank can continue supplying energy until its output reaches the Vmin level. In this way, total energy available during the discharge phase will be $$E_{c\_new} = \frac{C_s(V_{max}^2 - V_{min}^2)}{2} + \frac{\frac{C_s}{4}((2V_{min})^2 - V_{min}^2)}{2}$$

i.e., $$E_{c\_new} = E_c + \frac{\frac{C_s}{4}((2V_{min})^2 - V_{min}^2)}{2}$$

For Vmax=2V, Vmin=1V, 25% more energy can be extracted from the same amount of capacitance. This results in the corresponding increase in the total duration for which operation can be sustained in the absence of energy field. Alternatively, for the same time duration, 25% lower value of capacitance Cs is required.

At the start of charge phase, the effective capacitance remains at ¼ Cs (due to the series connection) and the voltage level starts increasing from Vmin to Vmax level. Once it reaches the Vmax level, the capacitor network switches back to the parallel mode, resulting in an output capacitance of Cs and an output voltage ½Vmax. From there, it continues charging as in a conventional operation to Vmax level.

In the above analysis, the relations are based on the second-order decomposition of Cs. Based on the above analysis, one can also derive the theoretical limit of such an approach. It is assumed that Vmax=2V and Vmin=1V.

Each switching results in ¼ capacitance at the output. Therefore, the total gain using an infinite decomposition of Cs will be:

$$1+¼+\frac{1}{16}+\frac{1}{64}+\ldots \infty$$

i.e., $1/(1¼)=4/3=1.33$

Figure 4:
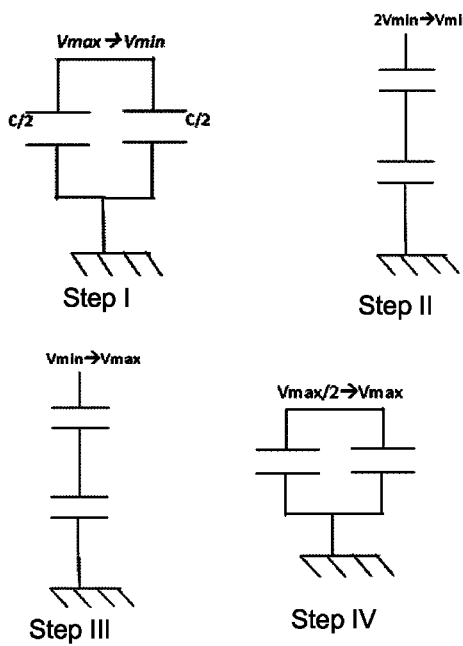
FIG. 4 shows the charging discharging phases of the circuit of FIG. 2.

Hence, the maximum theoretical gain will be 33% but will require infinite switches and capacitors. Considering this, a 2-phase capacitor bank is considered a suitable compromise between attainable efficiency and complexity. The system functioning can be divided into the following 4 phases, which are repeated in the system. These four phases are shown in FIG. 4.

Step-I: Discharge Phase-1

This is the beginning of discharge phase of the system. In this phase, capacitor bank discharges from Vmax to Vmin with output capacitance of Cs.

Step-II: Discharge Phase-2

In this phase, the capacitor bank switches to series mode as soon as Vmin is detected by the voltage sensor. This results in output capacitance of ¼ Cs. The output voltage is restored to 2Vmin level in the beginning and reduced to Vmin level at the end of this phase.

Step-III: Charge Phase-1

This is the beginning of charge phase. The voltage on series connected capacitor bank is charged from the Vmin to the Vmax level.

Step-IV: Charge Phase-2

As soon as voltage detector detects the Vmax level, it switches the capacitor bank into parallel configuration. This results in the output voltage reduced to ½ Vmax. At this point, capacitance starts getting charged to Vmax level.

The circuit of the invention enables a constant output voltage to be achieved, by using the capacitor bank signal to drive a voltage regulator, in particular an LDO regulator.

The invention enables silicon to be reduced as much as possible by developing area efficient concepts.

This invention provides a reconfigurable capacitor bank based energy storage mechanism for a wirelessly powered system. More energy can be extracted by reconfiguring the capacitors based on voltage sensing, which can eventually be used for sustaining longer duration operation and/or minimization of energy storage capacitance requirement. The capacitor bank is switched at the highest voltage, because a capacitor extracts higher energy from the current-based field per unit time when it is kept at highest voltage. By allowing the capacitor bank to charge always to the highest voltage (Vmax), more energy capturing is achieved per unit time.

Various other modifications will be apparent to those skilled in the art.

The invention claimed is:

1. A circuit for delivering power to a load and from a wireless power supply, comprising:
    an inductor coil configured to couple to an electromagnetic field of another inductor coil of the wireless power supply;
    a rectifier configured to rectify power from the inductor coil of the circuit a switchable capacitor bank configured to store the rectified power in capacitors switchable at least between a series and a parallel configuration;
    a voltage detecting device including circuitry configured to measure voltages or detect predetermined voltages, across the capacitor bank;
    a switch controller including circuitry configured to control the capacitor bank switching in dependence on the measured or detected voltages; and
    a voltage regulator configured to supply the load with a constant voltage power supply derived from the voltages across the capacitor bank.

2. A circuit as claimed in claim 1, further comprising a voltage clipper including circuitry configured to limit the maximum voltage across the capacitor bank.

3. A circuit as claimed in claim 1, further comprising a voltage limiter including circuitry configured to power down the circuit in response to detecting a minimum voltage across the capacitor bank.

4. A circuit as claimed claim 1, wherein the voltage regulator comprises a low drop out voltage regulator.

5. A circuit as claimed in claim 1, wherein the switch controller is adapted to control the capacitor bank by:
    during an increase in voltage across the capacitor bank, reducing the voltage across capacitor bank by switching the capacitors in capacitor bank from a series configuration to a parallel configuration in response to the voltage across the capacitor bank reaching a maximum voltage; and
    during a decrease in voltage across the capacitor bank, increasing the voltage across the capacitor bank is by switching the capacitors in capacitor bank from a parallel configuration to a series configuration in response to the voltage across the capacitor bank reaching a minimum voltage.

6. A contactless smart card comprising a circuit as claimed in claim 1.

7. A method for delivering power to a load from a wireless power supply, comprising:
    placing an inductor in the electromagnetic field of an inductor coil of a supply;
    storing power received from the inductor in a capacitor bank;
    measuring the voltage or detecting predetermined received voltages across the capacitor bank;
    controlling switching of capacitors in the capacitor bank at least between a series and a parallel configuration in dependence on the measured or detected voltages; and
    supplying a load with a constant voltage power supply derived from the voltage across the capacitor bank and by a voltage regulator.

8. A method as claimed in claim 7, comprising limiting the voltage across the capacitor bank to a maximum voltage.

9. A method as claimed in claim 7, comprising providing a power down if a minimum voltage is present across the capacitor bank.

10. A method as claimed in claim 7, comprising controlling the capacitor bank by:
   switching, during an increase in voltage across the capacitor bank, the capacitor bank from a series configuration to a parallel configuration when the voltage reaches a maximum voltage; and
   switching, during a decrease in voltage across the capacitor bank, the capacitor bank from a parallel configuration to a series configuration when the voltage reaches a minimum voltage.

11. A system containing circuitry with operational requirements that define a minimum and maximum voltage, the system comprising:
   an energy trapping circuit including an inductor and a rectifying circuit configured to receive energy from a remote transmitting coil and to produce a rectified output from the received energy;
   a capacitor bank configured to store power from the rectified output, the capacitor bank including:
      a plurality of capacitors; and
      a plurality of switches configured to adjust a voltage stored across the capacitor bank by switching the plurality of capacitors between series and parallel configurations;
   a voltage regulator configured to produce a regulated output voltage from the voltage stored across the capacitor bank; and
   a switch controller circuit configured to prevent the voltage stored across the capacitor bank from decreasing below the minimum voltage by switching the plurality of capacitors from the parallel configuration to the series configuration.

12. The system of claim 11, wherein the switch controller circuit is further configured to prevent the voltage stored across the capacitor bank from increasing above the maximum voltage by switching the plurality of capacitors from the series configuration to the parallel configuration.

13. The system of claim 12, further comprising a voltage clipper circuit that is configured to limit the voltage stored across the capacitor bank from exceeding the maximum voltage, and wherein the switch controller circuit is configured to switch the plurality of capacitors from the series configuration to the parallel configuration in response to the voltage clipper circuit.

14. The system of claim 11, further comprising a voltage limiter circuit that is configured to power down the system in response to the voltage stored across the capacitor bank going below the minimum voltage, and wherein the switch controller circuit is configured to switch the plurality of capacitors from the parallel configuration to the series configuration in response to the voltage limiter circuit.

15. The system of claim 11, wherein the voltage stored across the capacitor bank is prevented from increasing above the maximum voltage in response to the plurality of capacitors changing from the series configuration to the parallel configuration.

16. The system of claim 11, wherein the voltage stored across the capacitor bank is limited relative to exceeding the maximum voltage.

17. The system of claim 11, wherein the switch controller circuit is further configured to prevent the voltage stored across the capacitor bank from increasing above the maximum voltage by switching the plurality of capacitors from the series configuration to the parallel configuration, and further comprising:
   a voltage limiter circuit that is configured to power down the system in response to the voltage stored across the capacitor bank going below the minimum voltage, and wherein the switch controller circuit is configured to switch the plurality of capacitors from the parallel configuration to the series configuration in response to the voltage limiter circuit, and
   a voltage clipper circuit that is configured to limit the voltage stored across the capacitor bank from exceeding the maximum voltage, and wherein the switch controller circuit is configured to switch the plurality of capacitors from the series configuration to the parallel configuration in response to the voltage clipper circuit.

* * * * *